United States Patent [19]
Hamamatsu et al.

[11] Patent Number: 5,812,212

[45] Date of Patent: Sep. 22, 1998

[54] IMAGE DISPLAYING APPARATUS

[75] Inventors: Toshihiko Hamamatsu, Saitama; Masayuki Suematsu, Chiba; Makoto Kondo, Kanagawa, all of Japan

[73] Assignee: Sony Corporation, Tokyo, Japan

[21] Appl. No.: 684,655

[22] Filed: Jul. 19, 1996

[30] Foreign Application Priority Data

Jul. 21, 1995 [JP] Japan ................................. 7-185376

[51] Int. Cl.$^6$ .................................................. H04N 5/262
[52] U.S. Cl. .......................... 348/564; 348/588; 348/512; 348/568; 348/567
[58] Field of Search ..................................... 348/564, 565, 348/567, 568, 588, 598, 511, 512, 513; H04N 5/262, 5/265, 5/268

[56] References Cited

U.S. PATENT DOCUMENTS

| | | | |
|---|---|---|---|
| 4,816,915 | 3/1989 | Imai et al. ............................. | 348/567 |
| 5,289,284 | 2/1994 | Ersoz et al. ............................ | 348/561 |
| 5,329,366 | 7/1994 | Kuroda .................................. | 348/572 |
| 5,504,533 | 4/1996 | Ito et al. ................................ | 348/588 |
| 5,504,536 | 4/1996 | Yatomi et al. ......................... | 348/565 |
| 5,729,300 | 3/1998 | Ahn ....................................... | 348/564 |

Primary Examiner—Glenton B. Burgess

Attorney, Agent, or Firm—Jay H. Maioli

[57] ABSTRACT

An image displaying apparatus includes a line memory from which each line period segment of a first video signal is read during a half line period to produce a first half line period video signal segment, a frame memory from which each of line period segments contained in each frame period portion of a second video signal is read during a half line period, with a time reference set up in accordance with a synchronous signal contained in the first video signal, to produce a second half line period video signal segment, a signal selector operative to extract alternately the first and second half line period video signal segments to form a synthesized video signal for display, a dual image display portion for displaying images forming double window pictures in response to the synthesized video signal for display, a first timing signal generator for supplying the frame memory with a writing control signal, and a second timing signal generator for supplying the frame memory with a reading control signal, wherein the second timing signal generator is operative to control reading of the line period segments from the frame memory to produce the second half line period video signal segment to be performed for both of odd and even field period portions contained in each frame period portion of the second video signal when the first video signal is a noninterlaced video signal and the second video signal is an interlaced video signal.

6 Claims, 3 Drawing Sheets

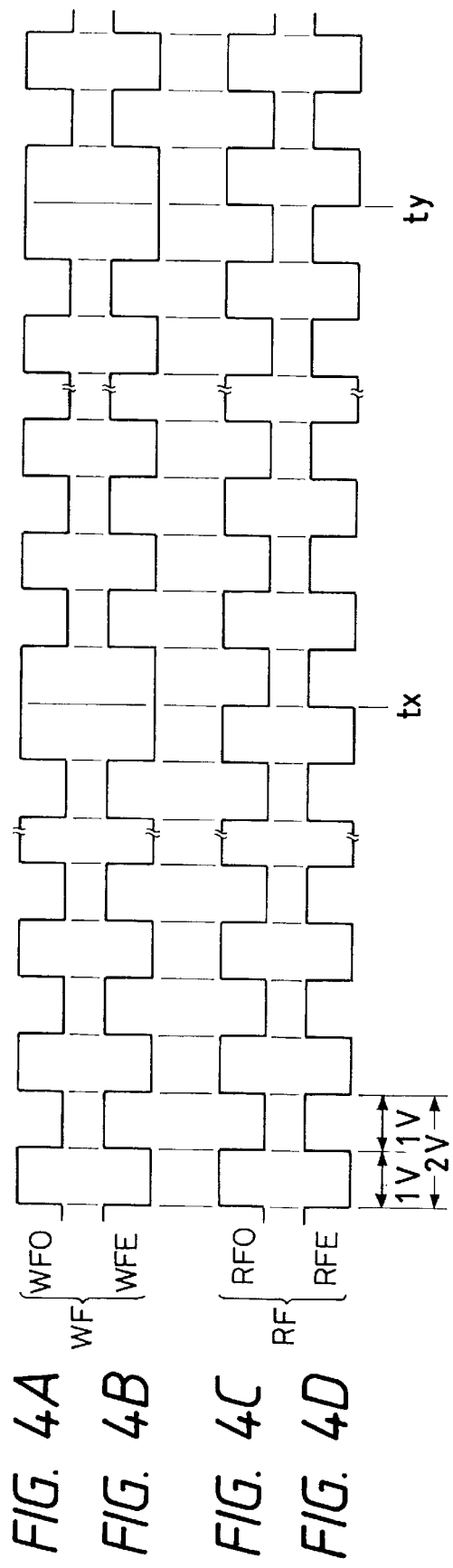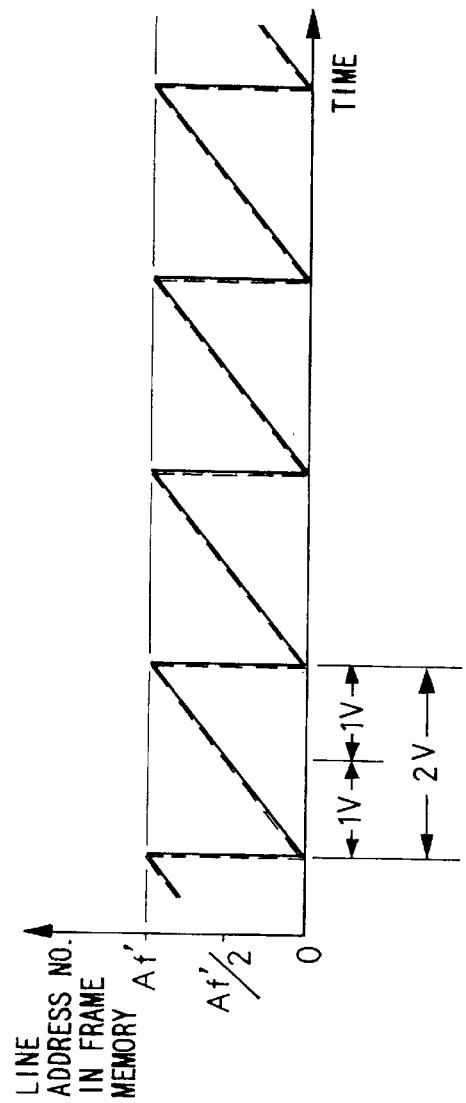

IMAGE DISPLAYING APPARATUS

BACKGROUND OF THE INVENTION

1. Field of the Invention

The present invention relates generally to image displaying apparatus, and is directed to an improvement in an image displaying apparatus operative to display images which are represented by two independent video signals, respectively, to form double window pictures on a single image displaying screen.

2. Description of the Prior Art

There has been proposed, as a part of diverse systems for providing various kinds of image information, a double window image displaying system by which images represented by two independent video signals, respectively, are displayed to form double window pictures on a single image displaying device. In the double window image displaying system, for example, an image displaying apparatus having an image displaying flat screen on which horizontal and vertical scannings (line and field scannings) are conducted is used for displaying images represented by two independent video signals, respectively, to form double window pictures which are arranged to be adjacent each other in the direction of line scanning on the image displaying flat screen.

When the images forming the double window pictures arranged to be adjacent each other in the direction of line scanning are displayed on the image displaying flat screen of the image displaying apparatus, supposing that the size in the direction of line scanning of one of the double window pictures is substantially the same as that of the other of the double window pictures and therefore the double window pictures are positioned on left and right halves of the image displaying flat screen, respectively, it is necessary that a video signal supplied to the image displaying apparatus for displaying the images forming the double window pictures contains successive line period segments, each of which comprises a first time base compressed video signal component formed by compressing the time base of one line period segment (1 H) of a first video signal into a half line period segment (0.5 H) and a second time base compressed video signal component formed by compressing the time base of one line period segment of a second video signal into a half line period segment and coupled with the first time base compressed video signal component.

To obtain the video signal containing such successive line period segments as described above to be used for displaying the images forming the double window pictures, it is considered to take, for example, such a signal synthesizing method as to utilize a line memory which is available for writing and reading one line period segment of a video signal for causing each line period segment of the first video signal to be compressed in time base into a half line period segment to produce the first time base compressed video signal component and a frame memory which is available for writing and reading one frame period portion (2V) including odd and even field period portions (each field period portion is represented as 1V) of a video signal, for causing each of the line period segments contained in each frame period portion of the second video signal to be compressed in time base into a half line period segment to produce the second time base compressed video signal component and to synthesize the first and second time base compressed video signal components with each other.

In the step for obtaining the first time base compressed video signal component, each of the line period segments of the first video signal is successively written in the line memory and then each written line period segment of the first video signal is read from the line memory during a reading period corresponding substantially to a half line period. The starting time point of the reading period is set to coincide with the ending time point of a period for writing each line period segment of the first video signal in the line memory. Namely, each of the line period segments of the first video signal is successively written in the line memory in such a manner as shown by a broken line in FIG. 1 wherein the axis of abscissas represents time and the axis of ordinates represents an address number in the line memory and the written line period segment of the first video signal is read from the line memory in such a manner as shown by a solid line in FIG. 1.

The reading of one line period segment from the line memory as shown by the solid line in FIG. 1 is caused to start at the time point where the writing of the subject line period segment in the line memory is completed and proceeded at the reading speed twice as rapid as the writing speed, so as to finish at a time point later by about a half line period than the time point where the writing of the subject line period segment in the line memory is completed. Accordingly, the reading of each line period segment from the line memory is intermittently conducted during one half line period at every other half line period. In such a manner as mentioned above, the first time base compressed video signal component is obtained from the line memory.

Further, in the step for obtaining the second time base compressed video signal component, odd and even field period portions forming each frame period portion of the second video signal is successively written in the field memories, and then, each of the line period segments contained in each written frame period portion of the second video signal is read from the frame memory during a reading period corresponding substantially to a half line period. As a result, a time base compressed video signal based on each frame period portion of the second video signal is obtained from the frame memory as the second time base compressed video signal component.

The first time base compressed video signal component obtained from the line memory and the second time base compressed video signal component obtained from the frame memory are so synthesized that, for example, each half line period segment of the second time base compressed video signal is coupled with each corresponding half line period segment of the first time base compressed video signal to form one line period segment. Consequently, a video signal representing images forming double window pictures in which each line period segment comprises a first half made of the first time base compressed video signal component based on the first video signal and a second half made of the second time base compressed video signal component based on the second video signal is produced.

Under such a situation, since the first and second video signals are not in a mutually synchronous condition but independent of each other, a problem in synchronization between the first and second video signals arises on production of the video signal representing images forming double window pictures. Accordingly, there has been proposed to make such an arrangement that although the first video signal is written in the line memory in accordance with a writing control signal based on a synchronous signal contained in the first video signal and the second video signal is written in the frame memory in accordance with a writing signal based on a synchronous signal contained in the second video signal, each of the line period segments of the first video signal is read from the line memory in accordance with a reading control signal based on a synchronous signal contained in the first video signal and each of the frame period portions of the second video signal is read from the frame memory in accordance with a reading control signal also based on the synchronous signal contained in the first video signal, so that the first time base compressed video signal component read from the line memory and the second time base compressed video signal component read from the frame memory are synchronous with each other.

When the video signal representing images forming double window pictures is produced as described above, each frame period portion of the second video signal is written in the frame memory in accordance with the writing control signal based on the synchronous signal contained in the second video signal and then each of line period segments contained in each written frame period portion of the second video signal is read from the frame memory in accordance with the reading control signal based on the synchronous signal contained in the first video signal. Therefore, in the case where the first video signal is not a video signal according to the interlaced scanning system (hereinafter, referred to as an interlaced video signal) but a video signal according to the noninterlaced scanning system (hereinafter, referred to as a noninterlaced video signal) and the second video signal is the interlaced video signal, each of the line period segments contained in each frame period portion of the second video signal which is the interlaced video signal is read from the frame memory in accordance with the reading control signal based on the synchronous signal contained in the first video signal which is the noninterlaced video signal.

The odd and even field period portions forming each frame period portion of the first video signal which is the noninterlaced video signal do not have such differences in synchronization therebetween as rendered between the odd and even field period portions forming each frame period portion of the second video signal which is the interlaced video signal but has the synchronous conditions identical with each other. Accordingly, the reading control signal which is formed based on the synchronous signal contained in the first video signal which is the noninterlaced video signal to be used for reading each of the line period segments contained in each frame period portion of the second video signal which is the interlaced video signal, is in the same synchronous condition during each field period portion of the first video signal.

Therefore, the reading of the line period segments contained in each frame period portion of the second video signal which is the interlaced video signal from the frame memory is conducted, in accordance with the reading control signal based on the synchronous signal contained in the first video signal which is the noninterlaced video signal, in such a manner that the line period segments contained in one of the odd and even field period portions forming each frame period portion of the second video signal are repeatedly read and the line period segments contained in the other of the odd and even field period portions forming each frame period portion are not read.

In other words, each of the line period segments contained in each frame period portion of the second video signal is successively written in a memory area corresponding to line address number 0 to Af (Af represents the number of line period segments contained in each frame period portion) of the frame memory as shown by a broken line in FIG. 2 wherein the axis of abscissas represents time and the axis of ordinates represents a line address number in the frame memory, and the written line period segments contained each frame period portion are read twice from a memory area corresponding to line address number 0 to Af/2 (Af/2 represents the number of line period segments contained in a half of each frame period portion, namely, in each field period portion) of the frame memory as shown by a solid line in FIG. 2. In the case of FIG. 2, the written line period segments contained in each even field period portion of the second video signal are not read from the frame memory but the written line period segments contained each odd field period portion of the second video signal are read twice from the frame memory.

Consequently, the second time base compressed video signal component obtained from the frame memory comes to contain only the line period segments contained in each odd field period portion of the second video signal and thereby one of the images forming the double window pictures displayed on the image displaying apparatus, which is represented by the second time base compressed video signal component, is so deteriorated as to be unnatural in motion or stiff in manner.

OBJECTS AND SUMMARY OF THE INVENTION

Accordingly, it is an object of the present invention to provide an image displaying apparatus operative to utilize a line memory for causing each line period segment of a first video signal to be compressed in time base into a half line period segment to produce a first time base compressed video signal component and a frame memory for causing each of line period segments contained in each frame period portion of a second video signal to be compressed in time base into a half line period segment to produce a second time base compressed video signal component under a condition wherein a time reference is set up in accordance with a synchronous signal contained in the first video signal, and to synthesize the first and second time base compressed video signal components to obtain a synthesized video signal representing images forming double window pictures, and further operative to display the images based on the synthesized video signal thus obtained, which avoids the aforementioned difficulties encountered with the prior art.

Another object of the present invention is to provide an image displaying apparatus operative to utilize a line memory for causing each line period segment of a first video signal to be compressed in time base into a half line period segment to produce a first time base compressed video signal component and a frame memory for causing each of line period segments contained in each frame period portion of a second video signal to be compressed in time base into a half line period segment to produce a second time base compressed video signal component under a condition wherein a time reference is set up in accordance with a synchronous signal contained in the first video signal, and to synthesize the first and second time base compressed video signal components to obtain a synthesized video signal representing images forming double window pictures, and further operative to display the images based on the synthesized video signal thus obtained, which avoids an adverse influence exerted upon the images forming double window pictures displayed based on the synthesized video signal due to the operation to produce the second time base compressed video signal component with the time reference set up in accordance with the synchronous signal contained in the first video signal, even in the case where the first video signal is a noninterlaced video signal and the second video signal is an interlaced video signal.

A further object of the present invention is to provide an image displaying apparatus operative to utilize a line memory for causing each line period segment of a first video signal to be compressed in time base into a half line period segment to produce a first time base compressed video signal component and a frame memory for causing each of the line period segments contained in each frame period portion of a second video signal to be compressed in time base into a half line period segment to produce a second time base compressed video signal component under a condition wherein a time reference is set up in accordance with a synchronous signal contained in the first video signal, and to synthesize the first and second time base compressed video signal components to obtain a synthesized video signal representing images forming double window pictures, and further operative to display the images based on the synthesized video signal thus obtained, by which, even in the case where the first video signal is a noninterlaced video signal and the second video signal is an interlaced video signal, each of the images forming double window pictures represented by the synthesized video signal can be displayed without being so deteriorated as to be unnatural in motion or stiff in manner.

According to the present invention, there is provided an image displaying apparatus comprising a line memory in which each of line period segments of a first video signal is successively written and from which each written line period segment of the first video signal is read during a reading period corresponding substantially to a half line period intermittently to produce a first half line period video signal segment having a compressed time base, a frame memory in which each of frame period portions of a second video signal is successively written and from which each of line period segments contained in each written frame period portion of the second video signal is read during a reading period corresponding substantially to a half line period intermittently, with a time reference set up in accordance with a synchronous signal contained in the first video signal, to produce a second half line period video signal segment having a compressed time base, a signal selector operative to extract alternately the first half line period video signal segment obtained from the line memory and the second half line period video signal segment obtained from the frame memory to form a synthesized video signal for display, a dual image display portion for displaying images forming double window pictures corresponding to images represented by the first and second video signals, respectively, in response to the synthesized video signal for display obtained from the signal selector, a first timing signal generating portion for supplying the frame memory with a writing control signal for controlling writing of each frame period portion of the second video signal in the frame memory, and a second timing signal generating portion for supplying the frame memory with a reading control signal for controlling reading of the line period segments contained in each written frame period portion of the second video signal from the frame memory, wherein the second timing signal generating portion is operative to cause the reading of the line period segments from the frame memory to produce the second half line period video signal segments to be performed for both of odd and even field period portions contained in each frame period portion of the second video signal when the first video signal is a noninterlaced video signal and the second video signal is an interlaced video signal.

In the image displaying apparatus thus constituted in accordance with the present invention, when the frame period portion of the second video signal which is the interlaced video signal is written in the frame memory and the line period segments contained in each written frame period portion of the second video signal is read from the frame memory, with the time reference set up in accordance with the synchronous signal contained in the first video signal which is the noninterlaced video signal, to produce the second half line period video signal segment, the reading control signal generated to synchronize with the synchronous signal contained in the first video signal by the second timing signal generating portion is supplied to the field memory for causing the line period segments contained in the written frame period portion of the second video signal to be rear from the whole frame memory. Therefore, the reading of the line period segments contained in the written frame period portion of the second video signal which is the interlaced video signal from the frame memory is performed for both of odd and even field period portions contained in each frame period portion of the second video signal in accordance with the reading control signal generated to synchronize with the synchronous signal contained in the first video signal which is the noninterlaced video signal.

Consequently, the second half line period video signal segments which produced based on the line-period segments contained in both of the odd and even field period portions forming each frame period portion of the second video signal are intermittently obtained from the frame memory, and thereby one of the images forming the double window pictures displayed on the dual image display portion, which is represented by the second time base compressed video signal components, can be appropriately obtained without being so deteriorated as to be unnatural in motion or stiff in manner, together with the other of the images forming the double window pictures, which is represented by the first time base compressed video signal components.

The above, and other objects, features and advantages of the present invention will become apparent from the following detailed description taken in conjunction with the accompanying drawings.

BRIEF DESCRIPTION OF THE DRAWINGS

FIGS. 4A, 4B, 4C and 4D are waveform diagrams used for explaining the operation of the embodiment shown in FIG. 3; and FIG. 5 is a time chart used for explaining the operation of the embodiment shown in FIG. 3.

DESCRIPTION OF THE PREFERRED EMBODIMENT

Figure 3:
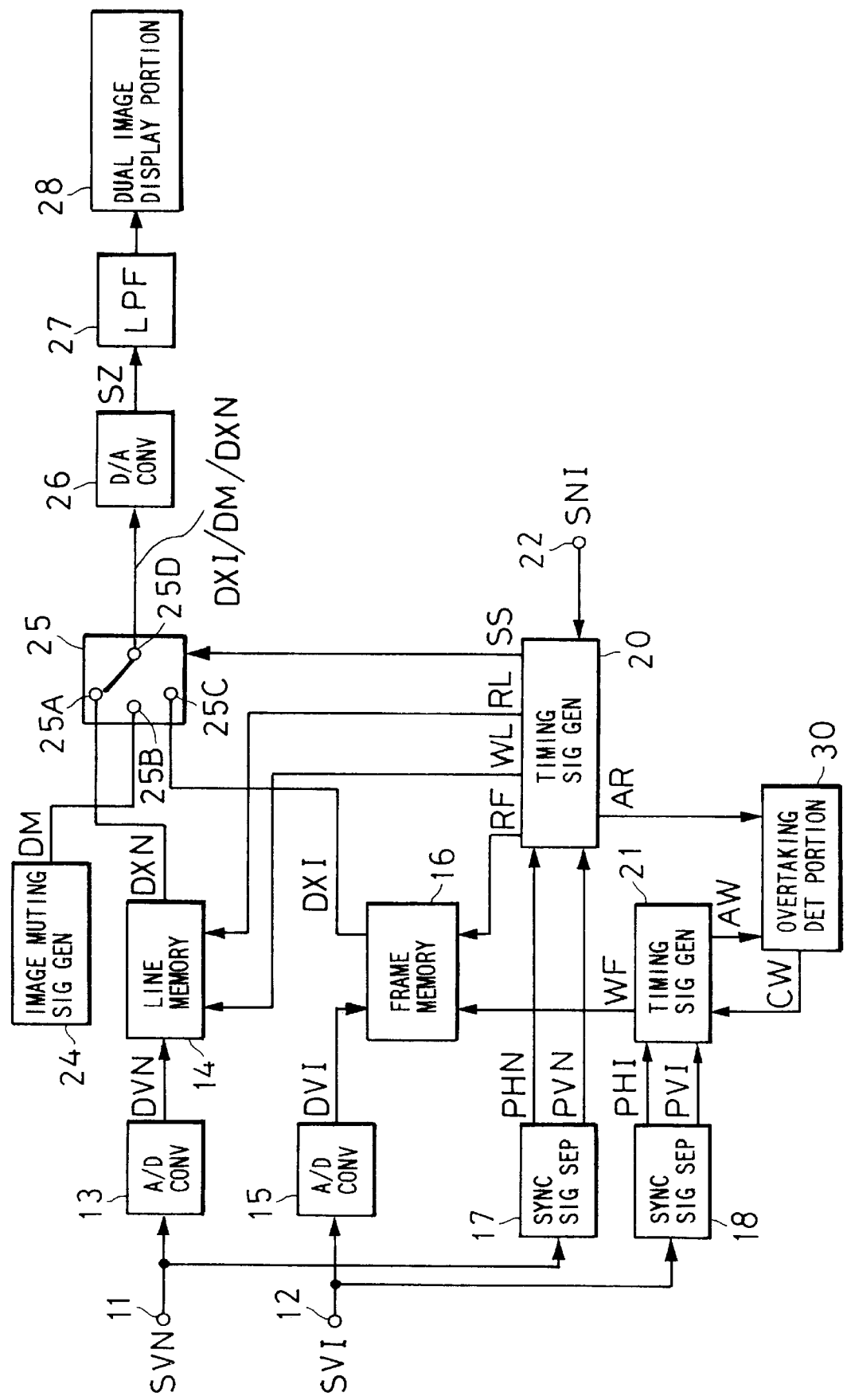
FIG. 3 is a schematic block diagram showing an embodiment of image displaying apparatus according to the present invention.

FIG. 3 shows an embodiment of an image displaying apparatus according to the present invention.

Referring to FIG. 3, two video signals SVN and SVI independent of each other are supplied to video signal input terminals 11 and 12, respectively. The video signal SVI is an interlaced video signal having successive frame period portions each consisting of odd and even field period portions in each of which the interlaced scanning is carried out and the video signal SVN is a noninterlaced video signal having successive frame period portions each consisting of odd and even field period portions in each of which the noninterlaced scanning is carried out so that the odd and even field period portions are in the same timing condition.

The video signal SVN supplied to the video signal input terminal 11 is digitalized in an analog to digital converter (A/D converter) 13 to produce a digital video signal DVN supplied to a line memory 14. The video signal SVI supplied to the video signal input terminal 12 is digitized in an A/D converter 15 to produce a digital video signal DVI supplied to a frame memory 16.

The video signal SVN from the video signal input terminal 11 and the video signal SVI from the video signal input terminal 12 are also supplied to synchronous signal separators 17 and 18, respectively. In the synchronous signal separator 17, a horizontal synchronous signal (line synchronous signal) PHN and a vertical synchronous signal (field synchronous signal) PVN contained in the video signal SVN are individually separated from the video signal SVN and the separated horizontal and vertical synchronous signals PHN and PVN are supplied to a timing signal generator 20. Similarly, in the synchronous signal separator 18, a horizontal synchronous signal (line synchronous signal) PHI and a vertical synchronous signal (field synchronous signal) PVI contained in the video signal SVI are individually separated from the video signal SVI and the separated horizontal and vertical synchronous signals PHI and PVI are supplied to a timing signal generator 21.

The timing signal generator 20 is further supplied though a signal terminal 22 with an instructing signal SNI which indicates that the video signal SVN from the video signal input terminal 11 is the noninterlaced video signal and the video signal SVI from the video signal input terminal 12 is the interlaced video signal.

In the timing signal generator 20, a group of timing signals including a writing control signal WL to the line memory 14, a reading control signal RL to the line memory 14, a reading control signal RF to the frame memory 16, and a selection control signal SS, each of which is synchronized with the horizontal and vertical synchronous signals PHN and PVN obtained from the synchronous signal separator 17, are produced. The reading control signal RF to the frame memory 16 is formed selectively in response to the instruction signal SNI so as to put the frame memory 16 in a condition where a signal written in the frame memory 16 is read from the frame memory 16 in its entirety to produce a time base compressed signal. In the timing signal generator 21, a writing control signal WF to the frame memory 16 which is synchronized with the horizontal and vertical synchronous signals PHI and PVI obtained from the synchronous signal separator 18, are produced.

In the line memory 14 to which the digital video signal DVN obtained from the A/D converter 13 is supplied, each line period segment of the digital video signal DVN is successively written in accordance with the writing control signal WL from the timing signal generator 20 and then each written line period segment of the digital video signal DVN is read in accordance with the reading control signal RL from the timing signal generator 20 during a reading period substantially corresponding to a half line period. The writing control signal WL and reading control signal RL are operative to determine a time point with which the reading period substantially corresponding to a half line period commences so as to coincide with a time point at which a writing period for the line period segment of the digital video signal DVN which is currently read terminates.

Figure 1:
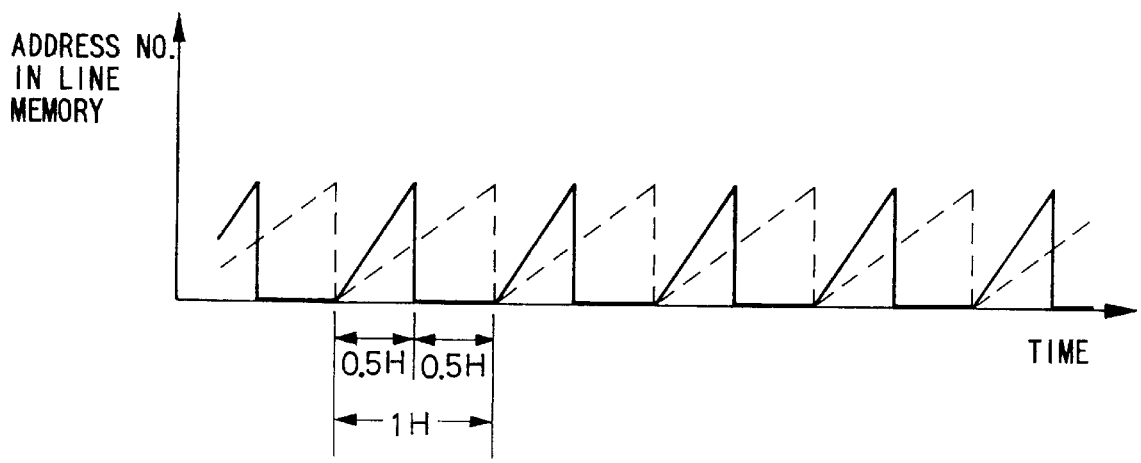
FIG. 1 is a time chart used for explaining time base compression of a video signal carried out by making use of a line memory.
Figure 2:
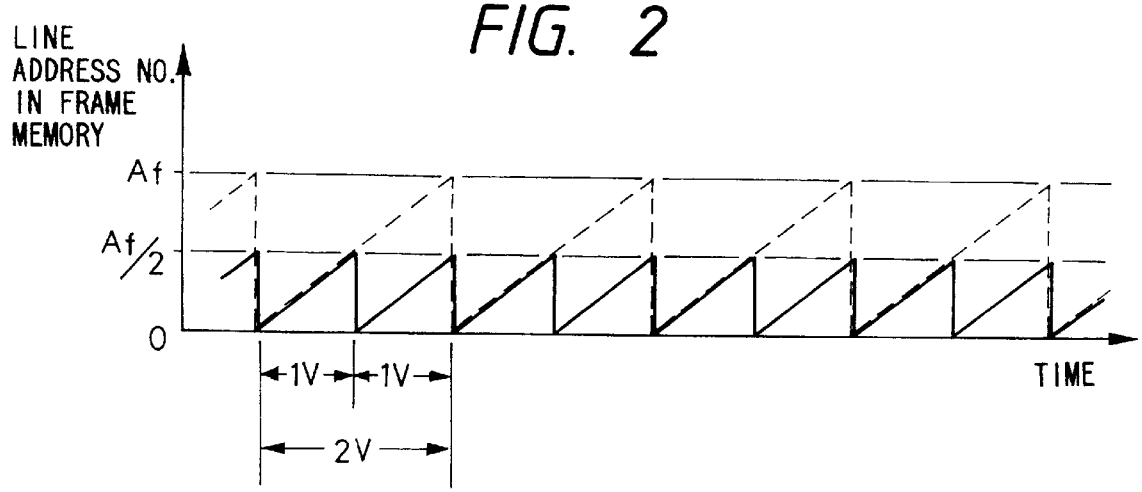
FIG. 2 is a time chart used for explaining time base compression of a video signal carried out by making use of a frame memory.

Accordingly, each line period segment of the digital video signal DVN is successively written in the line memory 14 in such a manner as shown by the broken line in FIG. 1 mentioned above and each written line period segment of the digital video signal DVN is read from the line memory 14 in such a manner as shown by the solid line in FIG. 1 mentioned above. That is, the reading of the line period segment of the digital video signal DVN from the line memory 14 is caused to start when the writing of the subject line period segment in the line memory 14 has been completed and proceeded at a reading speed twice as rapid as a writing speed, so as to finish at a time point later by about a half line period than the start of reading. Accordingly, the reading of each line period segment of the digital video signal DVN from the line memory 14 is intermittently carried out for a half line period at every other half line period, so that a half line period digital video signal segment DXN which is obtained by causing the line period segment of the digital video signal DVN to be compressed in time base into a digital video signal of a half line period is intermittently obtained from the line memory 14.

The frame memory 16 to which the digital video signal DVI obtained from the A/D converter 15 is supplied is further supplied with the writing control signal WF from the timing signal generator 21 and the reading control signal RF from the timing signal generator 20. In the frame memory 16, each of line period segments contained in the odd and even field period portions forming each frame period portion of the digital video signal DVI is successively written in accordance with the writing control signal WF, and thereafter, each of written line period segments contained in the odd field period portion of the digital video signal DVI is successively read in accordance with the reading control signal RF during the reading period substantially corresponding to a half line period on the video signal SVN so as to be compressed in time base and then each of written line period segments contained in the even field period portion of the digital video signal DVI is also successively read in accordance with the reading control signal RF during the reading period substantially corresponding to a half line period on the video signal SVN so as to be compressed in time base. That is, each of the written line period segments contained in the odd and even field period portions forming each frame period of the digital video signal DVI are successively read to be compressed in time base.

In such a case, the writing control signal WF obtained from the timing signal generator 21 comprises, for example, an odd field writing signal WFO and an even field writing signal WFE, as shown in FIGS. 4A and 4B, respectively, and the reading control signal RF obtained from the timing signal generator 20 comprises, for example, an odd field reading signal RFO and an even field reading signal RFE, as shown in FIGS. 4C and 4D, respectively. The writing of the line period segments contained in the odd and even field period portions forming each frame period portion of the digital video signal DVI in the frame memory 16 is carried out in response to, for example, high level portions of each of the odd and even field writing signals WFO and WFE and the reading of the written line period segments contained in the odd and even field period portions forming each frame period portion of the digital video signal DVI from the frame memory 16 is carried out in response to, for example, high level portions of each of the odd and even field reading signals RFO and RFE.

Therefore, the line period segments contained in the odd and even field period portions forming each frame period portion of the digital video signal DVI are written in a memory area corresponding to line address number 0 to Af (Af represents the number of line period segments contained in each frame period portion) of the frame memory 16, as shown by a broken line in FIG. 5 wherein the axis of abscissas represents time and the axis of ordinates represents a line address number in the frame memory 16, and the written line period segments contained each frame period portion of the digital video signal DVI are read from the memory area corresponding to line address number 0 to Af' of the frame memory 16, as shown by a solid line in FIG. 5. Consequently, in such a case as shown in FIG. 5, the written line period segments contained the odd and even field period portions forming each frame period portion of the digital video signal DVI are fully read from the frame memory 16 to be compressed in time base.

As a result, a half line period digital video signal segment DXI which is produced by causing each of the line period segments contained in the odd and even field period portions forming each frame portion of the digital video signal DVI to be compressed in time base into a digital video signal of a half line period on the video signal SVN is intermittently obtained from the frame memory 16.

The half line period digital video signal segment DXN obtained from the line memory 14 is supplied to a selective contact 25A of a signal selector 25, and the half line period digital video signal segment DXI obtained from the frame memory 16 is supplied to a selective contact 25C of the signal selector 25. Further, a digital image muting signal DM from an image muting signal generator 24 is supplied to a selective contact 25B provided between the selective contacts 25A and 25C.

The signal selector 25 is controlled in operation by the selection control signal SS which is derived from the timing signal generator 20 and synchronized with the horizontal and vertical synchronous signals PHN and PVN separated from the video signal SVN, so that a movable contact 25D is repeatedly moved to be connected with the selective contacts 25A, 25B and 25C successively during a period substantially corresponding to a line period on the video signal SVN. During each period substantially corresponding to a line period on the video signal SVN, a condition in which the movable contact 25D is connected with the selective contact 25A continues for a duration shorter a little bit than a half line period on the video signal SVN and a condition in which the movable contact 25D is connected with the selective contact 25C also continues for a duration shorter a little bit than a half line period on the video signal SVN. As a result, the movable contact 25D is connected with the selective contact 25B for a very short duration in each period substantially corresponding to a line period on the video signal SVN.

In the signal selector 25, in response to each frame period portion of the video signal SVN, the half line period digital video signal segment DXN supplied to the selective contact 25A is extracted through the movable contact 25D for the duration shorter a little bit than a half line period on the video signal SVN, then the digital image muting signal DM supplied to the selective contact 25B is extracted to the movable contact 25D for the very short duration, and thereafter the half line period digital video signal segment DXI supplied to the selective contact 25C is extracted through the movable contact 25D for the duration shorter a little bit than a half line period on the video signal SVN during each period corresponding to each line period on the video signal SVN. Therefore, such a condition that the half line period digital video signal segment DXN, the digital image muting signal DM and the half line period digital video signal segment DXI are successively derived from the movable contact 25D of the signal selector 25 to form a digital video signal of one line period is repeated to produce a digital video signal of one frame period.

The digital video signal of one frame period in which each line period segment comprises the half line period digital video signal segment DXN, the digital image muting signal DM and the half line period digital video signal segment DXI is obtained through the movable contact 25D are supplied to a digital to analogue converter (D/A converter) 26 to be converted into an analogue video signal SZ representing images forming double window pictures.

The analogue video signal SZ representing images forming double window pictures thus obtained from the D/A converter 26 is subjected to noise elimination at a low pass filter (LPF) 27 and then supplied to a dual image display portion 28. In the dual image display portion 28, an image displaying flat screen on which line and field scannings are conducted is provided and the images forming double window pictures which include an image represented by the video signal SVN and an image represented by the video signal SVI are displayed on the image displaying flat screen. These images forming double window pictures are arranged to be adjacent each other in the direction of line scanning with a muted portion based on the digital image muting signal DM between.

When the images forming double window pictures are displayed on the dual image display portion 28 as described above, the half line period digital video signal segments DXI which are produced based on the line period segments contained in both of the odd and even field period portions forming each frame period portion of the digital video signal DVI are intermittently obtained from the frame memory 16, and thereby one of the images forming the double window pictures displayed on the dual image display portion 28, which is represented by the half line period digital video signal segments DXI, can be appropriately obtained without being so deteriorated as to be unnatural in motion or stiff in manner, together with the other of the images forming the double window pictures, which is represented by the half line period digital video signal segments DXN.

The timing signal generator 20 constitutes reading control means which is operative to produce the odd and even field reading signals RFO and RFE forming the reading control signal RF synchronized with the synchronous signals in the video signal SVN which is the noninterlaced video signal, by which the written line period segments contained the odd and even field period portions forming each frame period portion of the digital video signal DVI are fully read from the frame memory 16 to be compressed in time base, and to supply the frame memory 16 with the odd and even field reading signals RFO and RFE forming the reading control signal RF, when the video signal SVN is the noninterlaced video signal and the video signal SVI is the interlaced video signal.

Under such a situation as mentioned above, a writing position indicating signal AW representing a writing address number in line segment of the frame memory 16 is derived from an address counter which is provided in the timing signal generator 21 to be used for generating the writing control signal WF, and similarly a reading position indicating signal AR representing a reading address number in line segment of the frame memory 16 is derived from an address counter which is provided in the timing signal generator 20 to be used for generating the reading control signal RF. The writing position indicating signal AW and reading position indicating signal AR are supplied to an overtaking detecting portion 30.

In the overtaking detecting portion 30, the reading address number in line segment of the frame memory 16 represented by the reading position indicating signal AR is compared with the writing address number in line segment of the frame memory 16 represented by the writing position indicating signal AW in order to detect an overtaking reading condition in which each of the line period segments contained in each frame period portion of the digital video signal DVI is written in the frame memory 16 and then each of the written line period segments contained in each frame period portion of the digital video signal DVI is read from the frame memory 16 in such a manner that the reading address number in line segment of the frame memory 16 overtakes the writing address number in line segment of the frame memory 16. When the overtaking reading condition is detected by the overtaking detecting portion 30, an overtaking detection output signal CW is supplied from the overtaking detecting portion 30 to the timing signal generator 21 and the odd and even field writing signals WFO and WFE forming the writing control signal WF are adjusted in timing of being sent out in response to the overtaking detection output signal CW in the timing signal generator 21.

Each of the odd and even field writing signals WFO and WFE forming the writing control signal WF obtained from the timing signal generator 21 is produced to be synchronized with the vertical synchronous signal PVI separated from the video signal SVI in the synchronous signal separator 18. As shown in FIGS. 4A and 4B, the odd field writing signal WFO has a high level during each odd field period on the video signal SVI and a low level during each even field period on the video signal SVI and puts the frame memory 16 in a writing state when it has the high level, and the even field writing signal WFE has a high level during each even field period on the video signal SVI and a low level during each odd field period on the video signal SVI and puts the frame memory 16 in a writing state when it has the high level.

Each of the odd and even field reading signals RFO and RFE forming the reading control signal RF obtained from the timing signal generator 20 is produced to be synchronized with the vertical synchronous signal PVN separated from the video signal SVN in the synchronous signal separator 17. As shown in FIGS. 4C and 4D, the odd field reading signal RFO has a high level during each odd field period on the video signal SVN and a low level during each even field period on the video signal SVN and puts the frame memory 16 in a reading state when it has the high level, and the even field reading signal RFE has a high level during each even field period on the video signal SVN and a low level during each odd field period on the video signal SVN and puts the frame memory 16 in a reading state when it has the high level.

When the overtaking reading is not caused in the frame memory 16, the odd and even field writing signals WFO and WFE forming the writing control signal WF obtained from the timing signal generator 21 and the odd and even field reading signals RFO and RFE forming the reading control signal RF obtained from the timing signal generator 20 are in such a conditions before a time point tx as shown in FIGS. 4A to 4D.

In the condition before the time point tx in FIGS. 4A to 4D, the odd field writing signal WFO has the high level during each odd field period on the video signal SVI and the low level during each even field period on the video signal SVI as shown in FIG. 4A and the even field writing signal WFE has the low level during each odd field period on the video signal SVI and the high level during each even field period on the video signal SVI as shown in FIG. 4B. Further, each of the odd and even field reading signals RFO and RFE has alternately the high and low levels during every field period on the video signal SVN in such a manner that the odd field reading signal RFO has the low level when the even field reading signal RFE has the high level and the odd field reading signal RFO has the high level when the even field reading RFE has the low level.

Accordingly, in the condition before the time point tx in FIGS. 4A to 4D, each of the line period segments contained in each odd field period portion of the digital video signal DVI is successively written in the frame memory 16 in response to the high level portion of the odd field writing signal WFO and each written line period segment is read from the frame memory 16 in response to the high level portion of the odd field reading signal RFO. Similarly, in the condition before the time point tx in FIGS. 4A to 4D, each of the line period segments contained in each even field period portion of the digital video signal DVI is successively written in the frame memory 16 in response to the high level portion of the even field writing signal WFE and each written line period segment is read from the frame memory 16 in response to the high level portion of the even field reading signal RFE.

Under such a situation, supposing that the overtaking reading condition is continuously detected by the overtaking detecting portion 30 and the overtaking detection output signal CW is supplied from the overtaking detecting portion 30 to the timing signal generator 21 during a period from the time point tx to a time point ty, each of the odd and even field writing signals WFO and WFE is reversed in level to have the low level instead of the high level and the high level instead of the low level in response to the overtaking detection output signal CW at the time point tx and maintains the reversed condition through the period from the time point tx to the time point ty in the timing signal generator 21.

That is, in the period from the time point tx to the time point ty, the odd field writing signal WFO has the low level during each odd field period on the video signal SVI and the high level during each even field period on the video signal SVI as shown in FIG. 4A and the even field writing signal WFE has the high level during each odd field period on the video signal SVI and the low level during each even field period on the video signal SVI as shown in FIG. 4B. On the other hand, as shown in FIGS. 4C and 4D, each of the odd and even field reading signals RFO and RFE has alternately the high and low levels during every field period on the video signal SVI in such a manner that the even field reading signal RFE has the low level when the odd field reading signal RFO has the high level and the even field reading signal RFE has the high level when the odd field reading signal RFO has the low level.

Accordingly, during the period from the time point tx to the time point ty as shown in FIGS. 4A to 4D wherein the overtaking reading is caused in the frame memory 16 and the overtaking reading condition is continuously detected by the overtaking detecting portion 30, each of the line period segments contained in each even field period portion of the digital video signal DVI is successively written in the frame memory 16 in response to the high level portion of the odd field writing signal WFO and, during the next field period on the video signal SVI after the writing of the line period segments contained in the even field period portion of the digital video signal DVI has been finished, each written line period segment of each even field period portion of the digital video signal DVI is read from the frame memory 16 in response to the high level portion of the odd field reading signal RFO. Further, during the period from the time point tx to the time point ty as shown in FIGS. 4A to 4D, each of the line period segments contained in each odd field period portion of the digital video signal DVI is successively written in the frame memory 16 in response to the high level portion of the even field writing signal WFE and, during the next field period on the video signal SVI after the writing of the line period segments contained in the odd field period portion of the digital video signal DVI has been finished, each written line period segment of each odd field period portion of the digital video signal DVI is read from the frame memory 16 in response to the high level portion of the even field reading signal RFE.

As described above, the half line period digital video signal segment DXI obtained from the frame memory 16 is formed substantially under the condition wherein the overtaking reading is not caused in the frame memory 16 and therefore does not include discontinuous portions resulting from the overtaking reading. Accordingly, when the half line period digital video signal segment DXI obtained from the frame memory 16 is supplied to the selective contact 25C of the signal selector 25 and the digital video signal of one field period in which each line period segment comprises the half line period digital video signal segment DXN, the digital image muting signal DM and the half line period digital video signal segment DXI is supplied to the D/A converter 26 to be converted into the analogue video signal SZ representing the images forming double window pictures, the images forming double window pictures displayed on the dual image display portion 28 to which the analogue video signal SZ representing the images forming double window pictures is supplied are provided with effectively suppressed defects of display resulting from the overtaking reading in the frame memory 16.

After that, in a period after the time point ty shown in FIGS. 4A to 4D, the overtaking reading condition is not detected by the overtaking detecting portion 30 and the overtaking detection output signal CW is ceased to be supplied from the overtaking detecting portion 30 to the timing signal generator 21. Then, each of the odd and even field writing signals WFO and WFE is reversed in level again to be put in the same condition as before the time point tx. That is, in the period after the time point ty shown in FIGS. 4A to 4D, the odd field writing signal WFO has the high level during each odd field period on the video signal SVI and the low level during each even field period on the video signal SVI as shown in FIG. 4A and the even field writing signal WFE has the low level during each odd field period on the video signal SVI and the high level during each even field period on the video signal SVI as shown in FIG. 4B. Further, each of the odd and even field reading signals RFO and RFE still has alternately the high and low levels during every field period on the video signal SVN in such a manner that the even field reading signal RFE has the low level when the odd field reading signal RFO has the high level and the even field reading signal RFE has the high level when the odd field reading signal RFO has the low level.

The timing signal generator 21 substantially constitutes a writing controller which is operative to control a timing for writing of the odd field period portions of the digital video signal DVI in the frame memory 16 and a timing for writing of the even field period portions of the digital video signal SVI in the frame memory 16 so as to suppress the defects of display resulting from the overtaking reading and appearing on the images forming double window pictures displayed by the dual image display portion 28 when the overtaking reading condition in the frame memory 16 is detected by the overtaking detecting portion 30.

In the aforementioned embodiment, although the half line period digital video signal segments DXI which are intermittently obtained from the frame memory 16 is produced based on the line period segments contained in both of the odd and even field period portions forming each frame period portion of the digital video signal DVI when the video signal SVN from the video signal input terminal 11 is the noninterlaced video signal and the video signal SVI from the video signal input terminal 12 is the interlaced video signal, it is possible to make such an arrangement that the half line period digital video signal segments DXI which are intermittently obtained from the frame memory 16 is produced based on only the line period segments contained in one of the odd and even field period portions forming each frame period portion of the digital video signal DVI when the video signal SVN from the video signal input terminal 11 is the noninterlaced video signal and the video signal SVI from the video signal input terminal 12 is the interlaced video signal, on condition that the video signal SVI from the video signal input terminal 12 represents still images.

What is claimed is:

1. An image displaying apparatus comprising:

line memory means in which each of a plurality of line period segments of a first video signal is successively written forming a plurality of written line period segments and from which each of said plurality of written line period segments of the first video signal is read during a reading period corresponding substantially to a half line period intermittently to produce a first half line period video signal segment having a compressed time base;

frame memory means in which each of a plurality of frame period portions of a second video signal is successively written forming a plurality of written frame period portions and from which each line period segment contained in each of said plurality of written frame period portions of the second video signal is read during a reading period corresponding substantially to a half line period intermittently, with a time reference set in accordance with a synchronous signal contained in the first video signal, to produce a second half line period video signal segment having a compressed time base;

signal selecting means operative to extract alternately the first half line period video signal segment obtained from the line memory means and the second half line period video signal segment obtained from the frame memory means to form a synthesized video signal for display;

dual image display means for displaying images forming double window pictures corresponding to images represented by the first and second video signals, respectively, in response to the synthesized video signal for display obtained from the signal selecting means;

first timing signal generating means for supplying the frame memory means with a writing control signal for controlling writing of each of said plurality of frame period portions of the second video signal in the frame memory means; and second timing signal generating means for supplying the frame memory means with a reading control signal for controlling reading of the plurality of line period segments contained in each of said plurality of written frame period portions of the second video signal from the frame memory means, wherein said second timing signal generating means is operative to cause the reading of the plurality of line period segments from the frame memory means to produce the second half line period video signal segments to be performed for both of odd and even field period portions contained in each of said plurality of frame period portions of the second video signal when the first video signal is a noninterlaced video signal and the second video signal is an interlaced video signal.

2. The image displaying apparatus according to claim 1 further comprising first synchronous signal separating means for extracting the synchronous signal contained in the first video signal and second synchronous signal separating means for extracting a synchronous signal contained in the second video signal, wherein the first timing signal generating means is operative to produce the writing control signal to be synchronized with the synchronous signal contained in the second video signal and the second timing signal generating means is operative to produce the reading control signal to be synchronized with the synchronous signal contained in the first video signal.

3. The image displaying apparatus according to claim 2, wherein said second timing signal generating means is operative to supply the line memory means with additional writing and reading control signals for controlling writing of each of said plurality of line period segments of the first video signal in the line memory means and reading of each of said plurality of written line period segments of the first video signal from the line memory means, respectively.

4. The image displaying apparatus according to claim 1 further comprising overtaking detecting means for detecting a condition of overtaking reading of the written line period segment contained in each of said plurality of frame period portions of the second video signal possibly caused in the frame memory means, wherein said first timing signal generating means is operative to control a timing for writing of each of said plurality of frame period portions of the second video signal in the frame memory means so as to suppress defects of display resulting from the condition of overtaking reading and appearing on the images forming double window pictures displayed on the dual image display means when the condition of overtaking reading of one of the plurality of line period segments is detected by the overtaking detecting means.

5. The image displaying apparatus according to claim 4, wherein said overtaking detecting means is operative to cause the first timing signal generating means to control the timing for writing of each one of said frame period portions of the second video signal in the frame memory means when the condition of overtaking reading of one of the plurality of line period segments is detected by the overtaking detecting means.

6. The image displaying apparatus according to claim 4, wherein said first timing signal generating means is operative to maintain a condition resulting from a control which is carried out when the condition of overtaking reading of one of the plurality of line period segments is detected by the overtaking detecting means up to a time point at which the condition of overtaking reading of one of the plurality of line period segments is no longer detected by the overtaking detecting means.

\* \* \* \* \*